(12) United States Patent
Zhang et al.

(10) Patent No.: US 10,237,911 B2
(45) Date of Patent: Mar. 19, 2019

(54) PACKET DATA CONVERGENCE PROTOCOL (PDCP) ENHANCEMENTS IN DUAL-CONNECTIVITY NETWORKS

(71) Applicant: Intel IP Corporation, Santa Clara, CA (US)

(72) Inventors: Yujian Zhang, Beijing (CN); Candy Yiu, Portland, OR (US); Youn Hyoung Heo, San Jose, CA (US); Ana Lucia Pinheiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/495,825

(22) Filed: Sep. 24, 2014

(65) Prior Publication Data

US 2015/0215827 A1 Jul. 30, 2015

Related U.S. Application Data

(60) Provisional application No. 61/933,847, filed on Jan. 30, 2014.

(51) Int. Cl.
*H04W 76/34* (2018.01)
*H04W 28/02* (2009.01)
(Continued)

(52) U.S. Cl.
CPC ............. *H04W 76/34* (2018.02); *H04L 1/00* (2013.01); *H04L 47/34* (2013.01);
(Continued)

(58) Field of Classification Search
CPC .... H04W 76/064; H04W 28/0247; H04L 1/00
See application file for complete search history.

(56) References Cited

U.S. PATENT DOCUMENTS

2004/0042491 A1* 3/2004 Sarkkinen ............. H04L 1/1642
370/469
2006/0009158 A1 1/2006 Bernhard et al.
(Continued)

FOREIGN PATENT DOCUMENTS

JP 2013062882 * 4/2013 ............ H04W 36/02
JP 2013062882 A 4/2013
(Continued)

OTHER PUBLICATIONS

International Search Report and Written Opinion dated May 8, 2015 from International Application No. PCT/US2015/013298.
(Continued)

*Primary Examiner* — Zhensheng Zhang
(74) *Attorney, Agent, or Firm* — Schwabe, Williamson & Wyatt, P.C.

(57) ABSTRACT

In embodiments, apparatuses, methods, and storage media may be described for identifying, by a master evolved NodeB (MeNB), one or more packet data convergence protocol (PDCP) packets that were previously scheduled to be transmitted to a user equipment (UE) by a secondary eNB (SeNB). The PDCP packets that are identified by the MeNB may then be transmitted, or retransmitted, to the UE. Additionally, embodiments may include apparatuses, methods, and storage media for allowing the UE to identify one or more parameters related to a PDCP reordering process to be performed by the UE. Other embodiments may be claimed.

10 Claims, 5 Drawing Sheets

(51) Int. Cl.
| | |
|---|---|
| *H04L 1/00* | (2006.01) |
| *H04L 12/801* | (2013.01) |
| *H04W 88/08* | (2009.01) |
| *H04W 88/02* | (2009.01) |
| *H04W 76/15* | (2018.01) |

(52) U.S. Cl.
CPC ... *H04W 28/0226* (2013.01); *H04W 28/0247* (2013.01); *H04W 76/15* (2018.02); *H04W 88/02* (2013.01); *H04W 88/08* (2013.01)

(56) References Cited

U.S. PATENT DOCUMENTS

| | | | |
|---|---|---|---|
| 2009/0310563 | A1 | 12/2009 | Chou et al. |
| 2014/0301188 | A1* | 10/2014 | Koskinen ............... H04L 47/32 370/230 |
| 2015/0271713 | A1* | 9/2015 | Kim .................. H04W 36/0055 455/437 |
| 2016/0192245 | A1* | 6/2016 | He .................... H04W 36/0033 370/331 |
| 2016/0262149 | A1* | 9/2016 | Futaki ................... H04W 16/32 |

FOREIGN PATENT DOCUMENTS

| | | | | |
|---|---|---|---|---|
| WO | 2013/086410 | A2 | 6/2013 | |
| WO | WO2013086410 | * | 6/2013 | ............ H04W 72/04 |
| WO | WO 2015062085 | A1 * | 5/2015 | ........ H04W 72/1284 |

OTHER PUBLICATIONS

Intel Corporation, "RAN3 impacts of dual connectivity," 3GPP TSG-RAN3 Meeting #82, R2-132224, Nov. 11-15, 2013, San Francisco, USA, 6 Pages.

3GPP, "Technical Specification Group Radio Access Network; Evolved Universal Terrestrial Radio Access (E-UTRA); Study on Small Cell Enhancements for E-UTRA and E-UTRAN—Higher layer aspects (Release 12)," 3GPP TR 36.842 V1.0.0 (Nov. 2013), Nov. 26, 2013, Lte Advanced, 68 pages.

Office Action dated Feb. 23, 2016 from Taiwan Patent Application No. 104102890, 12 pages.

Office Action dated Mar. 9, 2017 from Korean Patent Application No. 2016-7016993, 8 pages.

Office Action dated Jul. 11, 2017 from Japanese Patent Application No. 2016-543685, 7 pages.

Intel Corporation, "RAN3 impacts of dual connectivity," 3GPP TSG-RAN3 Meeting #82, R2-132224, Agenda Item: 20.1, Nov. 11-15, 2013, San Francisco, USA, 7 pages.

Extended European Search Report dated Sep. 6, 2017 from European Patent Application No. 15743364.0, 8 pages.

ZTE Corporation, "Discussion on PDCP reordering issue for small cell," 3GPP TSG-RAN2 Meeting #85, R2-140115, Agenda Item: 7.2.1, Jan. 10-14, 2014, Prague, Czech, 6 pages.

Pantech, "Issue on timer based PDCP-reordering algorithm," 3GPP TSG-RAN WG2 Meeting #85, R2-140252, Agenda item: 7.2.1, Feb. 10-14, 2014, Prague, Czech Republic, 4 pages.

NTT Docomo, Inc., "UP bearer split comparison (3C vs. 3D)," 3GPP TSG-Ran WG2 #83bis, R2-133275, Agenda Item: 7.2.1, Oct. 7-11, 2013, Ljubljana, Slovenia, 8 pages.

Ericsson, "PDCP reordering for split bearers," 3GPP TSG-RAN WG2 #84, Tdoc R2-134229, Agenda Item: 7.2.4, Nov. 11-15, 2013, San Francisco, USA, 4 pages.

Notice of Preliminary Rejection dated Sep. 25, 2017 from Korean Patent Application No. 2016-7016993, 8 pages.

Pantech, "Signal flow modeling of SeNB change on dual connectivity," 3GPP TSG-RAN WG2 Meeting #84, R2-134423, Agenda Item: 7.2.2.1, Nov. 11-15, 2013, San Francisco, USA, 5 pages.

3GPP, "Technical Specification Group Radio Access Network; Evolved Universal Terrestrial Radio Access (E-UTRA); Packet Data Convergence Protocol (PDCP) specification (Release 11)," 3GPP TS 36.323 V11.2.0 (Mar. 2013), Mar. 18, 2013, Lte Advanced, 27 pages.

European Patent Office—Article 94(3) dated Apr. 9, 2018 from European Patent Application No. 15743364.0, 4 pages.

Japanese Patent Office—Final Rejection dated May 29, 2018 from Japanese Patent Application No. 2016/543685, 4 page.

Intel Corporation, "RAN3 impacts of dual connectivity," 3GPP TSG-RAN3 Meeting #82, R2-132224, Agenda Item: 20.1, Nov. 11-15, 2013, San Francisco, USA, 6 pages.

Korean Patent Office—Notice of Preliminary Rejection dated Oct. 1, 2018 from Korean Divisional Application No. 2018-7019873, 7 pages.

Blackberry UK Limited, "Further Discussion on U-Plane Protocol Architecture Designs," 3GPP TSG RAN WG2 Meeting #83, R2-132442, Agenda Item: 7.2.4, Aug. 19-23, 2013, Barcelona, 6 pages.

European Patent Office—Extended European Search Report dated Jan. 28, 2019 from European Divisional Application No. 18188403.2, 8 pages.

Pantech, "The necessity of RLC status report via Xn on UP 3C," 3GPP TSG-RAM WG2 Meeting #85, R2-140254, Agenda item: 7.2.1, Feb. 10-14, 2014, Prague, Czech Republic, 3 pages.

* cited by examiner

US 10,237,911 B2

PACKET DATA CONVERGENCE PROTOCOL (PDCP) ENHANCEMENTS IN DUAL-CONNECTIVITY NETWORKS

CROSS REFERENCE TO RELATED APPLICATION

The present application claims priority to U.S. Provisional Patent Application No. 61/933,847, filed Jan. 30, 2014, entitled "Advanced Wireless Communication Systems and Techniques," the entire disclosure of which is hereby incorporated by reference in its entirety.

FIELD

Embodiments of the present invention relate generally to the technical field of packet data convergence protocol (PDCP) layer use in dual-connectivity networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A dual-connectivity network may be a network where a user equipment (UE) can connect with more than one cell site simultaneously. A cell site may be considered to be an evolved NodeB (eNB). When a UE connects to two (or more) eNBs, it may receive data from both eNBs at the same time. In embodiments, one of the eNBs may be considered a Master eNB (MeNB), and another of the eNBs may be considered a Secondary eNB (SeNB).

In some dual-connectivity networks, the MeNB may manage the transmission of PDCP packets to the UE. PDCP packets may also be referred to as PDCP service data units (SDUs). Specifically, the MeNB may transmit some PDCP packets to a UE, while the SeNB transmits others of the PDCP packets to the UE. However, in some cases the packets may be received by the UE out of order. For example, if a message includes ordered packets 1, 2, 3, and 4, the MeNB may transmit packets 1 and 3, while the SeNB may transmit packets 2 and 4. In some cases, the packets from the SeNB may arrive at the UE before the packets from the MeNB arrive at the UE. Additionally, in some cases the UE may disconnect from the SeNB during or immediately after the transmission of the packets, and the MeNB may not be able to identify whether the packets from the SeNB have been successfully received by the UE.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
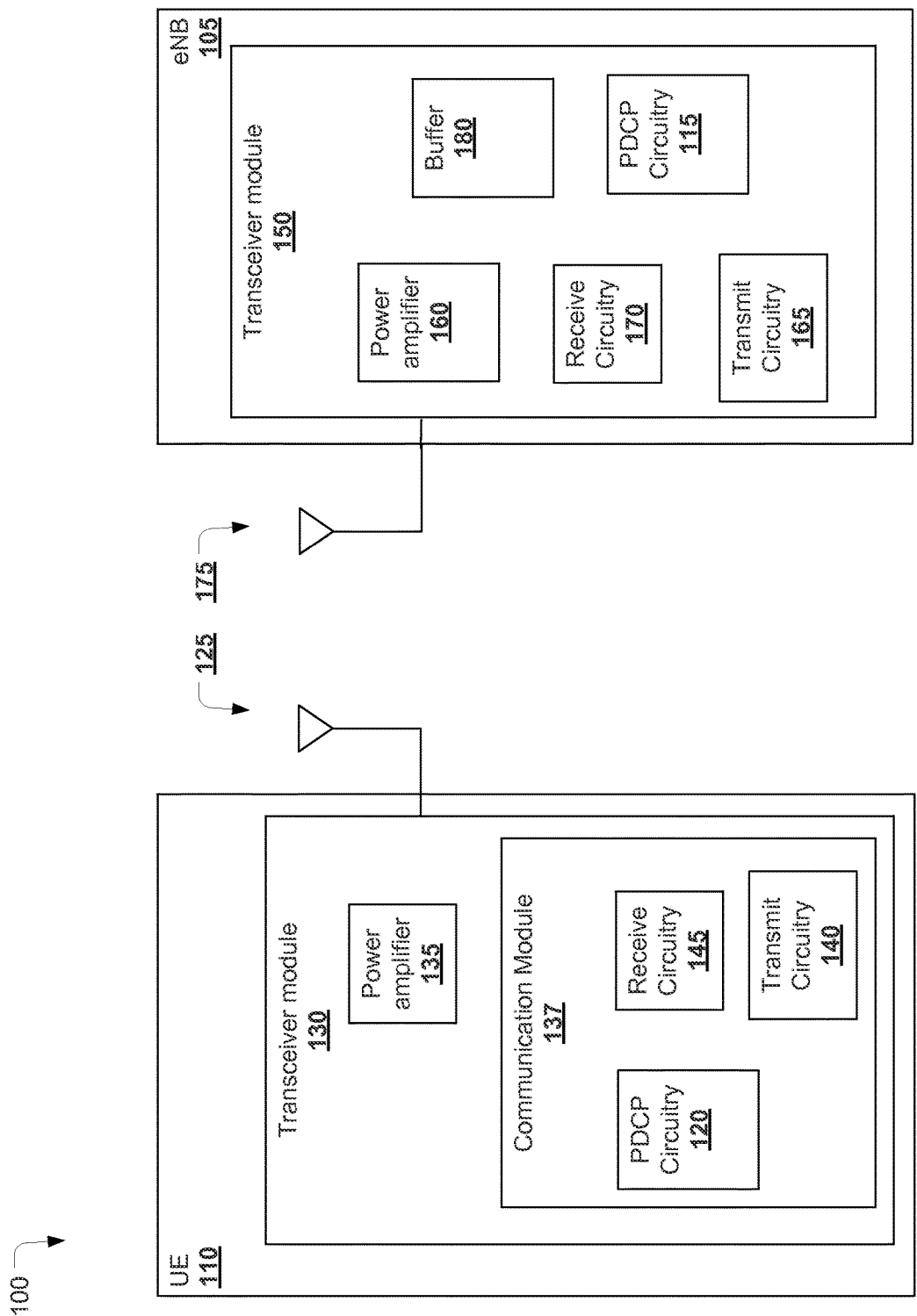
FIG. 1 schematically illustrates a high-level example of a network comprising a UE and an eNB, in accordance with various embodiments.

In dual connectivity, a UE may be served by serving cells associated with different eNBs. Therefore, it may also be called by inter-eNB carrier aggregation or inter-node resource aggregation. The eNB including PCell is defined as MeNB (Master eNB), while the eNB including SCell(s) only is defined as SeNB (Secondary eNB).

In dual connectivity, there may be two options for user-plane architecture. A first option is that there is S1-U connection between an S-GW and an SeNB and a radio bearer is not split between the MeNB and the SeNB (this option may be referred to as a non-bearer split option). A second option is that data is forwarded to the SeNB by the MeNB via X2 interface and a radio bearer is split into MeNB and SeNB (this option may be referred to as a bearer-split option). In the bearer-split option, for one radio bearer, there are two RLC entities at the UE side. The MeNB may include a PDCP that is associated with a first RLC of the MeNB and a second RLC of the SeNB (to which the data is forwarded via the X2 interface).

In embodiments, apparatuses, methods, and storage media may be described for identifying, by an MeNB, one or more PDCP packets that were previously scheduled to be transmitted to a UE by an SeNB. The PDCP packets that are identified by the MeNB may then be transmitted, or retransmitted, to the UE. In some embodiments, the packets may be identified based on a transmission of the packets by the SeNB. In other embodiments, the packets may be identified based on a PDCP status report transmitted from the UE, or an indication transmitted from the SeNB.

Additionally, embodiments may include apparatuses, methods, and storage media for allowing the UE to identify one or more parameters related to a PDCP reordering process to be performed by the UE. In some embodiments the parameters may be based on a radio resource control (RRC) message, a medium access control (MAC) control element (CE), or a physical layer channel message. In other embodiments, the reordering process may be related to a timer indicated by the MeNB to the UE. In other embodiments, the reordering process may be based on whether the UE previously had a timer running related to the PDCP process. Other embodiments may be claimed.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments a module may be a distinct circuit, while in other embodiments a module may include a plurality of circuits.

FIG. 1 schematically illustrates a wireless communication network 100 (hereinafter "network 100") in accordance with various embodiments. The network 100 may include a UE 110 that is communicatively coupled with an eNB 105. In embodiments, the network 100 may be a third generation partnership project (3GPP) Long Term Evolution (LTE), LTE Advanced (LTE-A) and/or LTE-Unlicensed (LTE-U) network. In other embodiments, the network 100 may be some other type of wireless communication network.

As shown in FIG. 1, the UE 110 may include a transceiver module 130, which may also be referred to as a multi-mode transceiver chip. The transceiver module 130 may be configured to transmit and receive signals using one or more protocols such as LTE, LTE-A, and/or LTE-U protocols. Specifically, the transceiver module 130 may be coupled with one or more of a plurality of antennas 125 of the UE 110 for communicating wirelessly with other components of the network 100, e.g., eNB 105 or another UE. The antennas 125 may be powered by a power amplifier 135 which may be a component of the transceiver module 130 as shown in FIG. 1, or separate from but coupled with the transceiver module 130. In one embodiment, the power amplifier 135 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 130 may include a communication module 137, which may be referred to as a broadband module, which may contain both transmit circuitry 140 configured to cause the antennas 125 to transmit one or more signals from the UE 110, and receive circuitry 145 configured to process signals received by the antennas 125. In other embodiments, the communication module 137 may be implemented in separate chips or modules, for example, one chip including the receive circuitry 145 and another chip including the transmit circuitry 140. In some embodiments, the transmitted or received signals may be cellular signals transmitted to or received from eNB 105. In some embodiments, the communication module 137 may include PDCP circuitry 120 to identify, generate, or interpret one or more PDCP packets or signals, as described in further detail below. In other embodiments, the PDCP circuitry 120 may be configured to perform reordering of PDCP packets, as described in further detail below. In other embodiments, the PDCP circuitry 120 may be separate from, but coupled with, one or more of the communication module 137 or transceiver module 130.

Similar to the UE 110, the eNB 105 may include a transceiver module 150. The transceiver module 150 may be further coupled with one or more of a plurality of antennas 175 of the eNB 105 for communicating wirelessly with other components of the network 100, e.g., UE 110. The antennas 175 may be powered by a power amplifier 160 which may be a component of the transceiver module 150, as shown in FIG. 1, or may be a separate component of the eNB 105. In one embodiment, the power amplifier 160 may provide the power for all transmissions on the antennas 175. In other embodiments, there may be multiple power amplifiers on the eNB 105. The use of multiple antennas 175 may allow for the eNB 105 to use transmit diversity techniques such as SORTD, MIMO, or FD-MIMO. In certain embodiments the transceiver module 150 may contain both transmit circuitry 165 configured to cause the antennas 175 to transmit one or more signals from the eNB 105, and receive circuitry 170 to process signals received by the antennas 175. In other embodiments, the transceiver module 150 may be replaced by transmit circuitry 165 and receive circuitry 170 which are separate from one another (not shown). In some embodiments, though not shown, the transceiver module 150 may include a communication module such as communication module 137 that includes the receive circuitry 170 and the transmit circuitry 165. In some embodiments, the transceiver module 150 may include PDCP circuitry 115, which may be similar to PDCP circuitry 120. In some embodiments, the transceiver module 150 may further include a buffer 180, which may be a permanent or transitory memory such as flash memory, dynamic random access memory (DRAM), double data rate type four synchronous DRAM (DDR4 SDRAM), or some other type of memory. In some embodiments the buffer 180 may be coupled with the PDCP circuitry 115, while in other embodiments the PDCP circuitry 115 may be an element of the buffer, or vice versa.

Figure 2:
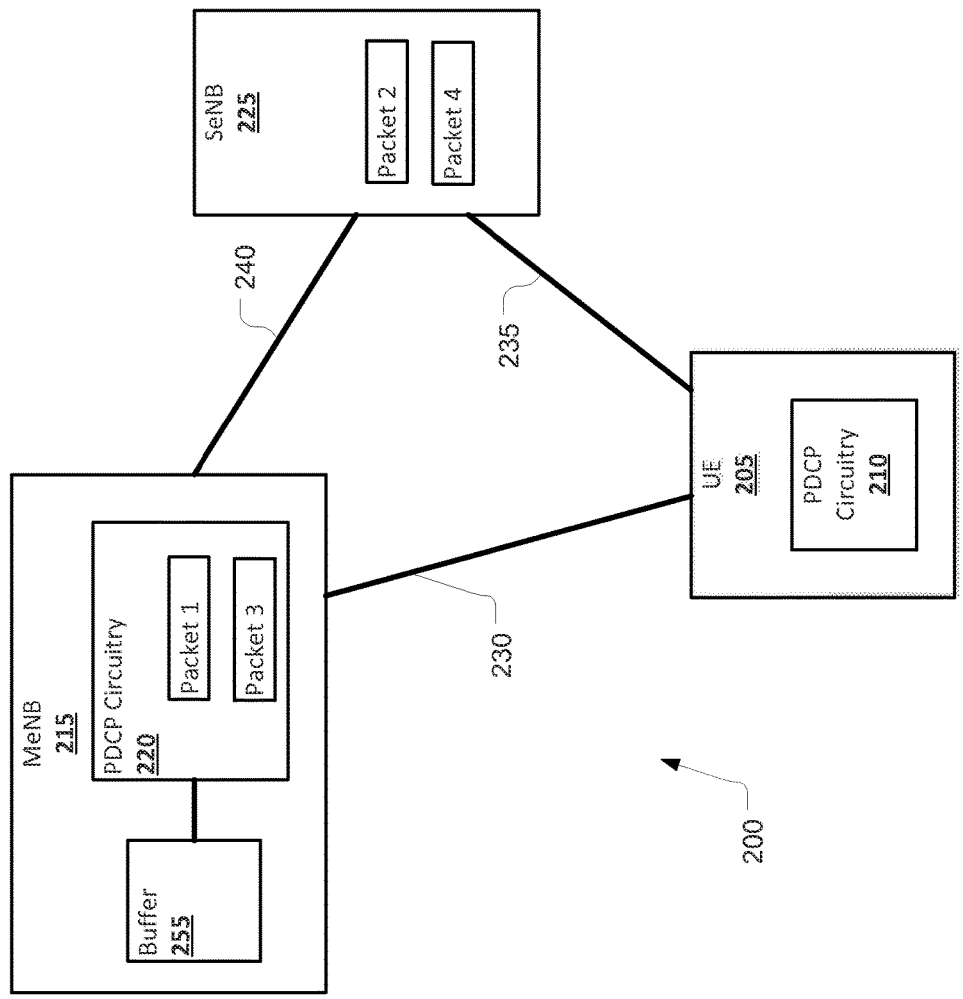
FIG. 2 schematically illustrates a high-level example of a network comprising a UE, an SeNB, and an MeNB, in accordance with various embodiments.

FIG. 2 depicts an example of a network 200 that may be similar to network 100 and include a UE 205 with PDCP circuitry 210, which may be similar to UE 110 and PDCP circuitry 120. The UE 205 may be communicatively coupled with an MeNB 215 with PDCP circuitry 220, which may be similar to eNB 105 and PDCP circuitry 115. Specifically, the UE 205 and MeNB 215 may be coupled via radio link 230, which may be a Uu radio link or radio bearer. Radio link 230 may be referred to as the MeNB-UE radio link. In some embodiments, the MeNB 215 may further include a buffer 255 which may be similar to buffer 180 of FIG. 1. As described above, in some embodiments the buffer 255 may be coupled with the PDCP circuitry 220, as shown. In other embodiments, the buffer 255 may be an element of the PDCP circuitry 220, or vice versa.

The UE 205 may be further coupled with an SeNB 225, which may also be similar to eNB 105. The UE 205 may be coupled with the SeNB 225 via a radio link 235 which may be a Uu radio link or radio bearer. Radio link 235 may be referred to as the SeNB-UE radio link. The SeNB 225 and MeNB 215 may be coupled via a radio link 240 which may be an X2 radio link or radio bearer.

As shown in FIG. 2, in some embodiments the MeNB 215 and the SeNB 225 may be configured to transmit a PDCP data to the UE 205. The PDCP data may include PDCP packets 1, 2, 3, and 4. In some embodiments, the MeNB 215, and particularly the PDCP circuitry 220 of the MeNB 215, may be configured to transmit PDCP packets 1 and 3. The SeNB 225 may be configured to transmit PDCP packets 2 and 4. In some embodiments, the SeNB 225 may have received PDCP packets 2 and 4 from the MeNB 215.

It will be understood that the specific PDCP packet numbering is only discussed herein for the purpose of this example, and in other embodiments more or fewer PDCP packets may be used, and the used PDCP packets may be numbered or designated differently. Additionally, to the extent that a specific numbered PDCP packet is described as being transmitted from the MeNB 215 or the SeNB 225, in other embodiments the MeNB 215 and/or SeNB 225 may transmit a different packet in other embodiments. Finally, it will be understood that in the description herein certain elements such as PDCP packets, indications, status reports, etc. are described as being transmitted or received by one or more of the MeNB 215, SeNB 225, and/or UE 205. In embodiments, these elements may be performed by the various PDCP circuitries of the MeNB 215, SeNB 225, and/or UE 205; however for the sake of clarity and brevity only the MeNB 215, SeNB 225, and/or UE 205 may be referred to.

As described above, in some cases the UE 205 may disconnect from the SeNB 225. In embodiments, the UE 205 may disconnect from the SeNB 225 based on a release indication from the MeNB 215. In legacy dual-connectivity networks, the MeNB 215 may not be aware of whether the SeNB 225 has transmitted PDCP packets 2 and 4 to the UE 205 over the SeNB-UE radio link 235. Additionally, the MeNB 215 may not be aware of whether the UE 205 has successfully received the PDCP packets.

In embodiments of the present disclosure, the MeNB 215 may not store PDCP packets 2 and 4 in buffer 235 after the PDCP packets 2 and 4 have been transmitted to the SeNB 225 over SeNB-UE radio link 235 for forwarding to the UE 205. In this embodiment, when the SeNB 225 is disconnected from by the UE 205, the SeNB 225 may forward PDCP packets that were either unacknowledged by the UE 205 or untransmitted by the SeNB 225 back to the MeNB 215. In embodiments, the SeNB 225 may forward the PDCP packets to the MeNB 215 based on an indication from the MeNB 215 and/or UE 205 as part of the disconnection process, or on its own accord as part of the disconnection process. In embodiments, the PDCP packets may be forwarded by the SeNB 225 to the MeNB 215 via X2 signaling.

The MeNB 215 may also transmit a request to the UE 205 via the MeNB-UE radio link 230. Specifically, the MeNB 215 may request that the UE 205 transmit an indication of one or more PDCP packets that have been received correctly by the UE 205 from the SeNB 225, and/or PDCP packets for which the UE 205 has requested retransmission from the SeNB 225. In response to the request, the MeNB 215 may receive an indication such as a PDCP status report from the UE 205 of the PDCP packets that have been received correctly and/or packets for which the UE 205 has requested retransmission from the SeNB 225. The MeNB 215 may use the PDCP status report received from the UE 205 in the PDCP status report to identify whether PDCP packets that were previously scheduled to be transmitted to the UE 205 from the SeNB 225, for example, PDCP packets 2 and 4, should be transmitted/retransmitted to the UE. The PDCP status report is discussed in further detail below.

In other embodiments of the present disclosure, the MeNB 215 may store PDCP packets that are transmitted to the SeNB 225 for forwarding to the UE 205 in buffer 255 of the MeNB 215. For example, after PDCP packets 2 and 4 are forwarded to the SeNB 225 by the MeNB 215, MeNB 215 may store PDCP packets 2 and 4 in buffer 255. In embodiments, the MeNB 215 may require an indication related to PDCP packets that have been successfully transmitted, unsuccessfully transmitted, or not transmitted by the SeNB 225 to the UE 205. In some embodiments, the indication may come from one or both of the SeNB 225 and the UE 205. Based on the indication, the MeNB 215 may remove from the buffer 255 the PDCP packets that were successfully transmitted to the UE 205 by the SeNB 225 and either transmit the untransmitted PDCP packets or retransmit the PDCP packets that were transmitted by the SeNB 225 but unsuccessfully received by the UE 205.

In embodiments where the SeNB 225 provides the indication, the SeNB 225 may send the indication to the MeNB 215 via X2 signaling. The X2 signaling may be included in flow control signaling exchanged between the MeNB 215 and the SeNB 225.

In embodiments where the UE 205 provides the indication, the UE 205 may provide the indication in a PDCP status report. The PDCP status report may be configured by an element of the network. For example, the PDCP status report may be configured by the MeNB 215, the SeNB 225, a network operator, or some entity of or associated with the core network. For example, the PDCP status report may be configured based on an information element (IE) received by the UE 205 from an entity of the core network. In embodiments, the IE may be called "PDCP-Config" and may be used to configure a periodic transmission by the UE 205 of a PDCP status report to the MeNB 215. In some embodiments, the PDCP-Config IE may be used to configure an event-triggered transmission by the UE 205 of a PDCP status report to the MeNB 215.

An example event that may trigger transmission of the PDCP status report may be receipt by the UE 205 of a certain number of PDCP packets. After a certain number of PDCP packets are received, the UE may transmit the PDCP status report to the MeNB 215. In some embodiments, the number of PDCP packets may only include packets received from the SeNB 225, while in other embodiments the number of PDCP packets may also or only include packets received from the MeNB 215. In some embodiments, the PDCP status report may be triggered based on an explicit request for the PDCP status report from the MeNB 215, as described below.

In some embodiments, the PDCP-Config IE, or some other IE, may include an indication of a timer that may be referred to as a "prohibit timer." In some embodiments, the prohibit timer may be signaled in an RRC signal or transmission received by the UE 205. The prohibit timer may disallow the UE 205 from sending the PDCP status report too frequently, which could tax power or bandwidth resources. In embodiments, the indication of the prohibit timer may include an indication of how many times the UE 205 may transmit the PDCP status report in a given time period.

In some embodiments, the MeNB 215 may request the PDCP status report from the UE 205. For example, in some embodiments the MeNB 215 may include the PDCP status report request in an RRC signal, a MAC CE, or a physical layer signal. The RRC signal could include, for example, an RRCConnectionReconfiguration message, which may trigger the UE 205 to disconnect from the SeNB 225. In the RRCConnectionReconfiguration message, the MeNB 215 could explicitly request that the UE 205 transmit the PDCP status report. Alternatively, the UE 205 may be configured to automatically transmit the PDCP status report upon receipt of the RRCConnectionReconfiguration message even without an explicit request to do so. The PDCP status report request in the physical layer signal could include a new field in a physical layer transmission such as a physical downlink control channel (PDCCH) transmission.

Figure 3:
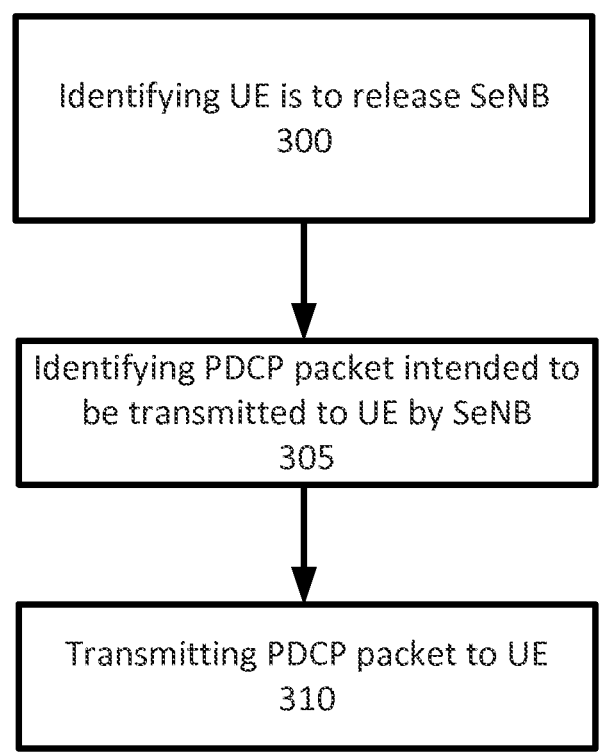
FIG. 3 depicts a process for identifying PDCP packets that may be resent to a UE, in accordance with various embodiments.

FIG. 3 depicts a process that may be used by the MeNB 215 to identify a PDCP packet for transmission to the UE 205. Initially, the MeNB 215 may identify that the UE 205 is to disconnect from the SeNB 225 at 300. The MeNB 215 may then identify a PDCP packet that was intended to be transmitted to the UE 205 by the SeNB 225 at 305. As described above, the PDCP packet may be identified based on one or more indications, transmissions, or status reports from the UE 205 and/or the SeNB 225. Specifically, the PDCP packet may be identified based on a transmission of the PDCP packet from the SeNB 225 to the MeNB 215. Additionally or alternatively, the PDCP packet may be identified based on a transmission of an indication of packets that were not transmitted or not acknowledged by the UE 205 from the SeNB 225 or the UE 205, for example, in a PDCP status report transmitted from the UE 205. In some embodiments, the PDCP packet may be identified based on an event-triggered PDCP status report from the UE 205. In other embodiments, the PDCP packet may be identified based on one or more of the other criteria described herein.

As discussed above, the PDCP packets 1, 2, 3, and 4 may be ordered packets of a larger PDCP transmission. However, in some embodiments the PDCP packets may be transmitted out of order. For example, as shown in FIG. 2, MeNB 215 may transmit PDCP packets 1 and 3 to UE 205. Then, the SeNB 225 may be disconnected from and the MeNB 215 may identify, for example, by way of the process of FIG. 3, that the MeNB 215 should transmit PDCP packets 2 and 4 to UE 205. The MeNB 215 may then transmit PDCP packets 2 and 4. However, as a result, UE 205 may receive the PDCP packets in the following order: 1, 3, 2, and 4. Because the UE 205 already received PDCP packet 3, the UE 205 may discard PDCP packet 2 unless PDCP reordering is performed. PDCP reordering may refer to a process wherein the UE 205 receives the PDCP packets out of order, for example, PDCP packets 1, 3, 2, and 4, and then reorders the packets to the correct order, for example, PDCP packets 1, 2, 3, and 4.

In legacy networks, when the SeNB 225 is being disconnected from, the UE 205 may disable PDCP reordering and stop any running reordering timers. However, as a result, packets such as packet 2 in the example above may be lost. Alternatively, the UE 205 may default to a reordering process specified for handover situations. However, in embodiments where the handover reordering process is used, the UE 205 may not use any reordering timers. Therefore, the PDCP reordering operation may stall. Finally, in some legacy networks, PDCP reordering may not be disabled. However, in those legacy networks the PDCP reordering process may not be needed at all times, and so significant bandwidth or power resources may be used on an unnecessary process.

In embodiments disclosed herein, the MeNB 215 may transmit an indication to the UE 205 that the UE 205 should disable PDCP reordering. For example, in some embodiments the MeNB 215 may include the indication that the UE 205 should disable PDCP reordering in an RRC signal, a MAC CE or a physical layer signal such as a new field in a PDCCH transmission.

In other embodiments, the UE 205 may start a timer as part of the disconnection from the SeNB 225. For example, the UE 205 may start the timer when the UE 205 receives an RRCConnectionReconfiguration message from the MeNB 215. Once the timer expires, the UE 205 may disable PDCP reordering. In some embodiments, the timer could be a fixed value, for example, 1 second long. In other embodiments, the length of the timer may be signaled by the core network, the network operator, the MeNB 215, or some other signal. For example, the length of the timer may be signaled in the RRCConnectionReconfiguration message.

In other embodiments, the UE 205 may be configured to detect whether PDCP reordering should be disabled. For example, the reordering process itself may include a reordering timer. The UE 205 may be configured to identify whether a reordering timer is running. As opposed to legacy networks where the UE 205 may automatically stop the reordering timer and the reordering process upon receipt of the RRCConnectionReconfiguration message, in embodiments herein the UE 205 may allow the reordering timer to proceed and stop the reordering process upon expiration of the timer. If a reordering timer is not running when the RRCConnectionReconfiguration message is received, the UE 205 may disable PDCP reordering.

Figure 4:
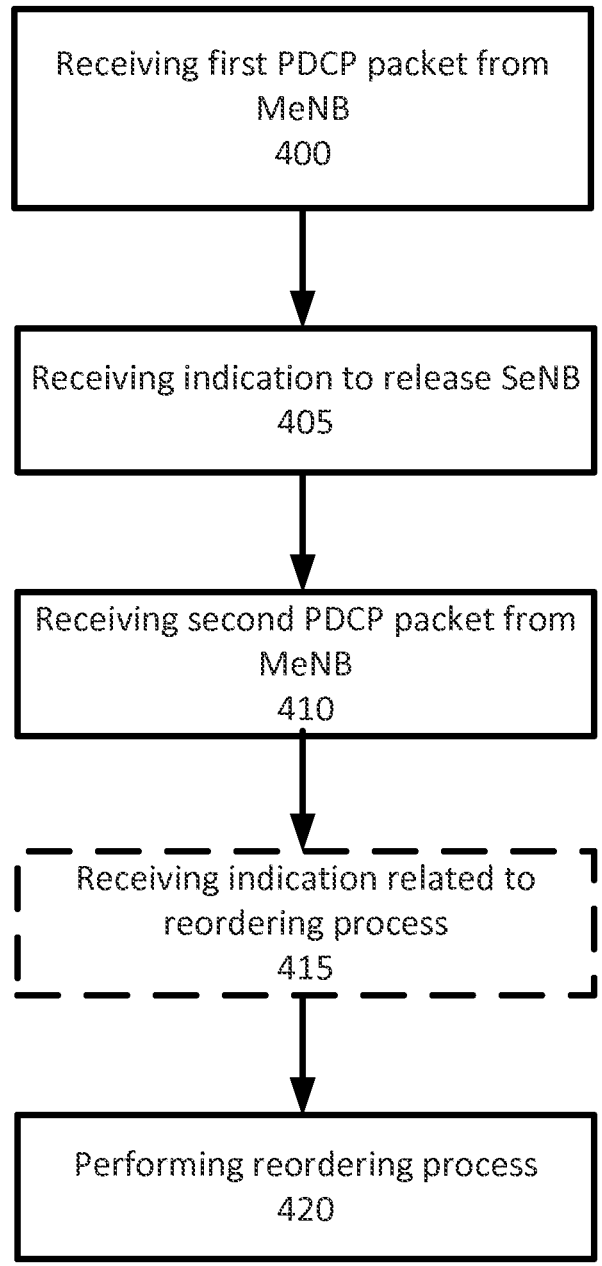
FIG. 4 depicts a process for identifying PDCP packet reordering parameters, in accordance with various embodiments.

FIG. 4 depicts a high level process that may be performed by UE 205 to identify whether PDCP reordering should be disabled. Initially, the UE 205 may receive a first PDCP packet from the MeNB 215 at 400. The UE 205 may then receive an indication that the UE 205 is to disconnect from the SeNB 225 at 405. As described above, the indication may be, for example, an RRCConnectionReconfiguration message transmitted from the MeNB 215. The UE 205 may then receive a second PDCP packet from the MeNB 215 at 410. As described above, in some embodiments the second PDCP packet received at 410 may be a PDCP packet that was supposed to be transmitted to the UE 205 by the SeNB 225.

Then, in some embodiments the UE 205 may optionally receive an indication related to whether to perform a reordering process at 415. The indication may be, for example, an indication received from the MeNB 215 described above in, for example, a MAC CE, an RRC message, or a physical layer message. In other embodiments, the indication may be an indication of a reordering timer in, for example, an RRCConnectionReconfiguration message as described above. In some embodiments, the UE 205 may not receive the indication. Then, the UE 205 may perform the reordering process at 420. For example, the UE 205 may identify, based on the indication, that the UE 205 is to perform the reordering process. In some embodiments, the UE 205 may identify that it should perform the reordering process based on the receipt of an indication of a reordering timer from the MeNB 215 as described above. In some embodiments, the UE 205 may identify that the reordering process is to be performed based on identification of a running PDCP reordering timer, as described above.

Figure 5:
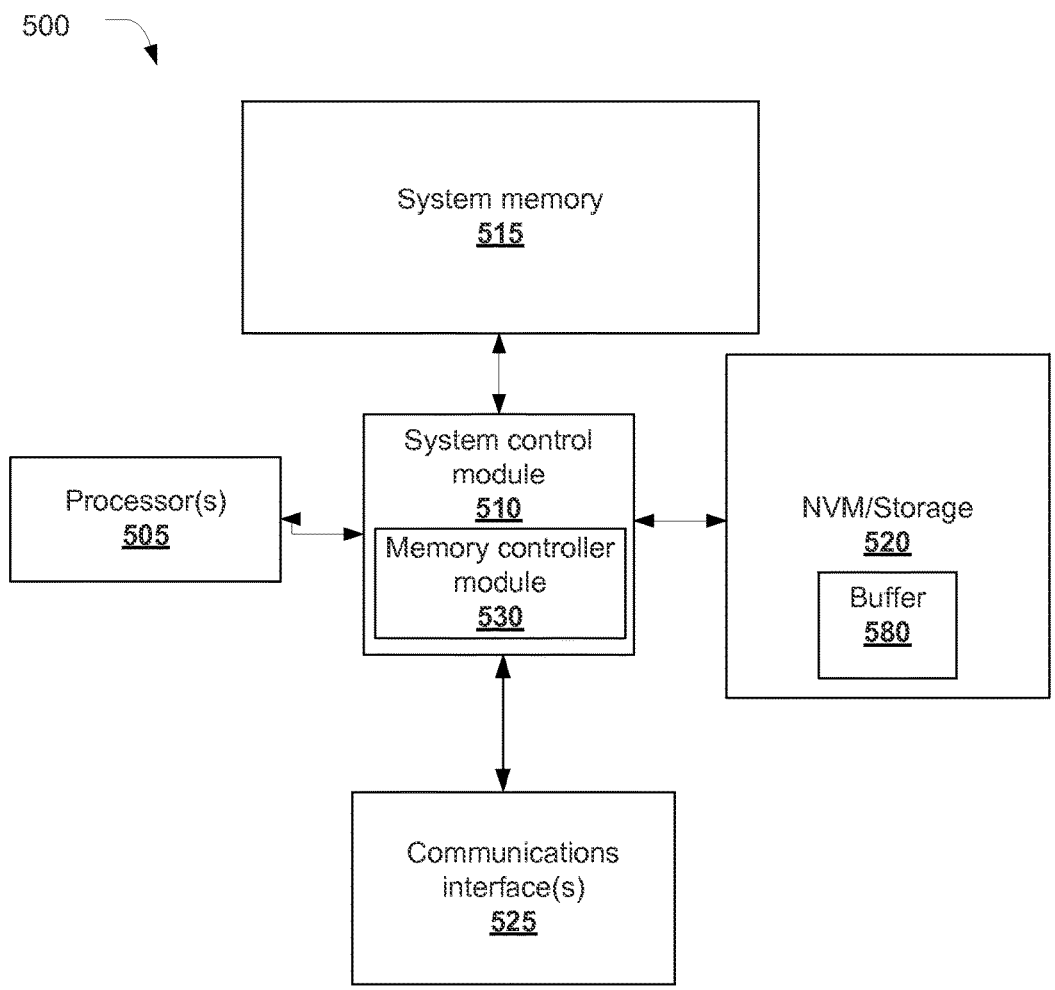
FIG. 5 schematically illustrates an example system that may be used to practice various embodiments described herein.

Embodiments of the present disclosure may be implemented into a system using any suitable hardware and/or software to configure as desired. FIG. 5 schematically illustrates an example system 500 that may be used to practice various embodiments described herein. FIG. 5 illustrates, for one embodiment, an example system 500 having one or more processor(s) 505, system control module 510 coupled to at least one of the processor(s) 505, system memory 515 coupled to system control module 510, non-volatile memory (NVM)/storage 520 coupled to system control module 510, and one or more communications interface(s) 525 coupled to system control module 510.

In some embodiments, the system 500 may be capable of functioning as the UE 110 or 205 as described herein. In other embodiments, the system 500 may be capable of functioning as eNB 105, SeNB 225, and/or MeNB 215 as described herein. In some embodiments, the system 500 may include one or more computer-readable media (e.g., system memory or NVM/storage 520) having instructions and one or more processors (e.g., processor(s) 505) coupled with the one or more computer-readable media and configured to execute the instructions to implement a module to perform actions described herein.

System control module 510 for one embodiment may include any suitable interface controllers to provide for any suitable interface to at least one of the processor(s) 505 and/or to any suitable device or component in communication with system control module 510.

System control module 510 may include memory controller module 530 to provide an interface to system memory 515. The memory controller module 530 may be a hardware module, a software module, and/or a firmware module.

System memory 515 may be used to load and store data and/or instructions, for example, for system 500. System memory 515 for one embodiment may include any suitable volatile memory, such as suitable DRAM, for example. In some embodiments, the system memory 515 may include DDR4 SDRAM.

System control module 510 for one embodiment may include one or more input/output (I/O) controller(s) to provide an interface to NVM/storage 520 and communications interface(s) 525.

The NVM/storage 520 may be used to store data and/or instructions, for example. NVM/storage 520 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. In some embodiments, NVM/storage 520 may include buffer 580 which may be similar to buffer 180 of FIG. 1.

The NVM/storage 520 may include a storage resource physically part of a device on which the system 500 may be installed or it may be accessible by, but not necessarily a part of, the device. For example, the NVM/storage 520 may be accessed over a network via the communications interface(s) 525.

Communications interface(s) 525 may provide an interface for system 500 to communicate over one or more network(s) and/or with any other suitable device. The system 500 may wirelessly communicate with the one or more components of the wireless network in accordance with any of one or more wireless network standards and/or protocols. In some embodiments the communications interface(s) 525 may include the transceiver modules 130 or 150. In some embodiments, the communications interface(s) 525 may include baseband circuitry.

For one embodiment, at least one of the processor(s) 505 may be packaged together with logic for one or more controller(s) of system control module 510, e.g., memory controller module 530. For one embodiment, at least one of the processor(s) 505 may be packaged together with logic for one or more controllers of system control module 510 to form a System in Package (SiP). For one embodiment, at least one of the processor(s) 505 may be integrated on the same die with logic for one or more controller(s) of system control module 510. For one embodiment, at least one of the processor(s) 505 may be integrated on the same die with logic for one or more controller(s) of system control module 510 to form a System on Chip (SoC).

In some embodiments the processor(s) 505 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 500 may be, but is not limited to, a server, a workstation, a desktop computing device, or a mobile computing device (e.g., a laptop computing device, a handheld computing device, a tablet, a netbook, a smartphone, a gaming console, etc.). In various embodiments, the system 500 may have more or fewer components, and/or different architectures. For example, in some embodiments, the system 500 includes one or more of a camera, a keyboard, liquid crystal display (LCD) screen (including touch screen displays), non-volatile memory port, multiple antennas, graphics chip, application-specific integrated circuit (ASIC), and speakers.

EXAMPLES

Example 1 may include an evolved NodeB (eNB) comprising: receive circuitry to receive an indication that a UE is to disconnect from a secondary eNB (SeNB); packet data convergence protocol (PDCP) circuitry coupled with the receive circuitry, the PDCP circuitry to identify, based on the indication, a PDCP packet previously scheduled to be transmitted to the UE by the SeNB; and transmit circuitry coupled to the PDCP circuitry, the transmit circuitry to transmit the PDCP packet to the UE.

Example 2 may include the eNB of claim 1, wherein the receive circuitry is further to receive the PDCP packet from the SeNB.

Example 3 may include the eNB of claim 2, wherein the receive circuitry is further to receive a status report from the UE related to the PDCP packet; and the PDCP circuitry is to identify the PDCP packet based on the status report.

Example 4 may include the eNB of claim 1, wherein the PDCP circuitry is to identify the PDCP packet in a buffer of the eNB.

Example 5 may include the eNB of claim 4, wherein the PDCP circuitry is to identify the PDCP packet based on a signal received from the second eNB or based on a signal received from the UE.

Example 6 may include the eNB of any of claims 1-5, wherein the first eNB is a master eNB (MeNB).

Example 7 may include a method comprising: identifying, by a first evolved NodeB (eNB), that a user equipment (UE) is to disconnect from a second eNB; identifying, by the first eNB, a packet data convergence protocol (PDCP) packet scheduled or previously scheduled to be transmitted to the UE by the second eNB; and transmitting, by the eNB, the PDCP packet to the UE.

Example 8 may include the method of claim 7, further comprising receiving the PDCP packet from the second eNB.

Example 9 may include the method of claim 8, wherein the PDCP packet is a first PDCP packet and further comprising transmitting, by the eNB, a status report request to the UE; and receiving, by the eNB, a status report from the UE in response to the status report request, wherein the status report includes an indication of a second PDCP packet received from the second eNB.

Example 10 may include the method of claim 7, wherein identifying the PDCP packet includes identifying the PDCP packet in a buffer of the first eNB.

Example 11 may include the method of claim 10, wherein identifying the PDCP packet is based on a signal received from the second eNB.

Example 12 may include the method of claim 10, wherein identifying the PDCP packet is based on a signal received from the UE.

Example 13 may include the method of any of claims 7-12, wherein the first eNB is a master eNB (MeNB) and the second eNB is a secondary eNB (SeNB).

Example 14 may include one or more non-transitory computer-readable media comprising instructions to cause a user equipment (UE), upon execution of the instructions by one or more processors of the UE, to: receive a first packet data convergence protocol (PDCP) packet from a master evolved NodeB (MeNB); receive, after reception of the first PDCP packet, an indication that the UE is to disconnect from a secondary eNB (SeNB); receive, after disconnection from the SeNB, a second PDCP packet from the MeNB that was previously scheduled to be transmitted by the SeNB; and perform a reordering process on the first and second PDCP packets.

Example 15 may include the one or more non-transitory computer-readable media of claim 14, wherein the reordering process is based on a PDCP reordering indication received from the MeNB in a radio resource control (RRC) signal, a medium access control (MAC) control element, or a physical layer signal.

Example 16 may include the one or more non-transitory computer-readable media of claim 14, wherein the instructions are further to: initiate, after reception of the indication to disconnect from the SeNB, a timer related to the reordering process; and stop the reordering process upon expiration of the timer.

Example 17 may include the one or more non-transitory computer-readable media of claim 16, wherein a length of the timer is a fixed value or based on an RRCConnectionReconfiguration message.

Example 18 may include the one or more non-transitory computer-readable media of claim 14, wherein the reordering process is based on whether a reordering timer is running when the indication that the UE is to disconnect from the SeNB is received.

Example 19 may include the one or more non-transitory computer-readable media of claim 18, wherein the reordering process is only performed if the reordering timer is running.

Example 20 may include a user equipment (UE) comprising: receive circuitry to: receive a first packet data convergence protocol (PDCP) packet from a master evolved NodeB (MeNB); and receive a second PDCP packet from the MeNB that was previously scheduled to be transmitted to the UE from a secondary eNB (SeNB); and PDCP circuitry coupled with the receive circuitry, the PDCP circuitry to: identify that the UE is to disconnect from the SeNB; and perform, subsequent to the disconnection from the SeNB, a reordering process on the first and second PDCP packets.

Example 21 may include the UE of claim 20, wherein the receive circuitry is further to receive a PDCP reordering indication related to the reordering process from the MeNB in a radio resource control (RRC) signal, a medium access control (MAC) control element, or a physical layer signal.

Example 22 may include the UE of claim 20, wherein the PDCP circuitry is further to initiate a timer related to the reordering process; and stop the reordering process upon expiration of the timer.

Example 23 may include the UE of claim 22 wherein a length of the timer is a fixed value or based on an RRCConnectionReconfiguration message.

Example 24 may include the UE of claim 20, wherein the PDCP circuitry is to perform the reordering process only if a reordering timer is running when an indication that the UE is to disconnect from the SeNB is received by the receive circuitry.

Example 25 may include the UE of any of claims 20-24, further comprising baseband circuitry coupled with the receive circuitry.

Example 26 may include a master evolved NodeB (MeNB) comprising: means to identify that a user equipment (UE) is to disconnect from a secondary eNB (SeNB); means to identify a packet data convergence protocol (PDCP) packet scheduled or previously scheduled to be transmitted to the UE by the SeNB; and means to transmit the PDCP packet to the UE.

Example 27 may include the MeNB of claim 26, further comprising means to receive the PDCP packet from the SeNB.

Example 28 may include the MeNB of claim 27, wherein the PDCP packet is a first PDCP packet and further comprising: means to transmit a status report request to the UE; and means to receive a status report from the UE in response to the status report request, wherein the status report includes an indication of a second PDCP packet received from the second eNB.

Example 29 may include the MeNB of claim 26, wherein the means to identify the PDCP packet are to identify the PDCP packet in a buffer of the MeNB.

Example 30 may include the MeNB of claim 29, wherein the means to identify the PDCP packet are to identify the PDCP packet based on a signal received from the SeNB.

Example 31 may include the MeNB of claim 29, wherein the means to identify the PDCP packet are to identify the PDCP packet based on a signal received from the UE.

Example 32 may include one or more non-transitory computer-readable media comprising instructions to cause a master evolved NodeB (MeNB), upon execution of the instructions by one or more processors of the MeNB, to: identify that a user equipment (UE) is to disconnect from a secondary eNB (SeNB); identify a packet data convergence protocol (PDCP) packet scheduled or previously scheduled to be transmitted to the UE by the SeNB; and transmit the PDCP packet to the UE.

Example 33 may include the one or more non-transitory computer-readable media of claim 32, further comprising instructions to receive the PDCP packet from the SeNB.

Example 34 may include the one or more non-transitory computer-readable media of claim 33, wherein the PDCP packet is a first PDCP packet and further comprising instructions to: transmit a status report request to the UE; and receive a status report from the UE in response to the status report request, wherein the status report includes an indication of a second PDCP packet received from the second eNB.

Example 35 may include the one or more non-transitory computer-readable media of claim 32, wherein the instructions to identify the PDCP packet include instructions to identify the PDCP packet in a buffer of the MeNB.

Example 36 may include the one or more non-transitory computer-readable media of claim 35, wherein the instructions to identify the PDCP packet include instructions to identify the PDCP packet based on a signal received from the SeNB.

Example 37 may include the one or more non-transitory computer-readable media of claim 35, wherein the instructions to identify the PDCP packet include instructions to identify the PDCP packet based on a signal received from the UE.

Example 38 may include a method comprising: receiving, by a user equipment (UE), a first packet data convergence protocol (PDCP) packet from a master evolved NodeB (MeNB); receiving, by the UE after reception of the first PDCP packet, an indication that the UE is to disconnect from a secondary eNB (SeNB); receiving, by the UE after disconnection from the SeNB, a second PDCP packet from the MeNB that was previously scheduled to be transmitted by the SeNB; and performing, by the UE, a reordering process on the first and second PDCP packets.

Example 39 may include the method of claim 38, wherein the reordering process is based on a PDCP reordering indication received from the MeNB in a radio resource control (RRC) signal, a medium access control (MAC) control element, or a physical layer signal.

Example 40 may include the method of claim 38, further comprising: initiating, by the UE after reception of the indication to disconnect from the SeNB, a timer related to the reordering process; and stopping, by the UE, the reordering process upon expiration of the timer.

Example 41 may include the method of claim 40, wherein a length of the timer is a fixed value or based on an RRCConnectionReconfiguration message.

Example 42 may include the method of claim 38, wherein the reordering process is based on whether a reordering timer is running when the indication that the UE is to disconnect from the SeNB is received.

Example 43 may include the method of claim 42, wherein the reordering process is only performed if the reordering timer is running.

Example 44 may include a user equipment (UE) comprising: means to receive a first packet data convergence protocol (PDCP) packet from a master evolved NodeB (MeNB); means to receive, after reception of the first PDCP packet, an indication that the UE is to disconnect from a secondary eNB (SeNB); means to receive, after disconnection from the SeNB, a second PDCP packet from the MeNB that was previously scheduled to be transmitted by the SeNB; and means to perform a reordering process on the first and second PDCP packets.

Example 45 may include the UE of claim 44, wherein the reordering process is based on a PDCP reordering indication received from the MeNB in a radio resource control (RRC) signal, a medium access control (MAC) control element, or a physical layer signal.

Example 46 may include the UE of claim 44, further comprising: means to initiate, after reception of the indication to disconnect from the SeNB, a timer related to the reordering process; and means to stop the reordering process upon expiration of the timer.

Example 47 may include the UE of claim 46, wherein a length of the timer is a fixed value or based on an RRCConnectionReconfiguration message.

Example 48 may include the UE of claim 44, wherein the reordering process is based on whether a reordering timer is running when the indication that the UE is to disconnect from the SeNB is received.

Example 49 may include the UE of claim 48, wherein the reordering process is only performed if the reordering timer is running.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A Master evolved NodeB (MeNB) of a dual connectivity network, the MeNB comprising:
   a buffer to store a plurality of packet data convergence protocol (PDCP) packets transmitted by the MeNB to a secondary eNB (SeNB) of the dual connectivity network for delivery to a user equipment (UE) by a radio link control (RLC) of the SeNB; and
   packet data convergence protocol (PDCP) circuitry coupled with the buffer, the PDCP circuitry to:
   identify, based on a status report from the SeNB, successful delivery of a first PDCP packet of the plurality of PDCP packets to the UE; and
   cause the first PDCP packet to be removed from the buffer based on said identification of the successful delivery of the PDCP packet;
   wherein:
   the UE is to simultaneously communicatively couple with the MeNB and the SeNB; the MeNB is to control a transmission of the SeNB;
   the PDCP circuitry is to identify an unsuccessful delivery of a second PDCP packet of the plurality of PDCP packets to the UE based on the status report or another status report received from the SeNB and cause an RLC of the MeNB to attempt to deliver the second PDCP packet to the UE; and
   the status report is a periodic status report, an event-based status report, or a trigger-based status report.

2. The MeNB of claim 1, wherein the status report is a periodic status report or a trigger-based status report.

3. The MeNB of claim 1, wherein the status report is to be received in flow control signaling over an X2 interface.

4. The MeNB of claim 1, wherein a plurality of status reports are to be received while the UE is simultaneously communicatively coupled with the MeNB and the SeNB.

5. The MeNB of claim 1, wherein the PDCP circuitry is further to cause transmission of a request for the status report to the SeNB.

6. One or more non-transitory, computer-readable media having instructions that, when executed by one or more processors, cause a master evolved node B (MeNB) of a dual connectivity network to:
   transmit a plurality of packet data convergence protocol (PDCP) packets to a secondary eNB (SeNB) of the dual connectivity network for delivery to a user equipment (UE) by a radio link control (RLC) of the SeNB;
   store the plurality of PDCP packets in a buffer;

identify, based on a status report from the SeNB, successful delivery of a first PDCP packet of the plurality of PDCP packets;

remove the PDCP packet from the buffer based on said identification of the successful delivery of the PDCP packet;

identify an unsuccessful delivery of a second PDCP packet of the plurality of PDCP packets to the UE based on the status report or another status report from the SeNB; and cause an RLC of the MeNB to attempt to deliver the second PDCP packet to the UE based on identification of the unsuccessful delivery, wherein the status report is a periodic status report, an event-based status report, or a trigger-based status report.

7. The one or more non-transitory, computer-readable media of claim 6, wherein the status report is a periodic status report or a trigger-based status report.

8. The one or more non-transitory, computer-readable media of claim 6, wherein the status report is to be received in flow control signaling over an X2 interface.

9. The one or more non-transitory, computer-readable media of claim 6, wherein a plurality of status reports are to be received while the UE is simultaneously communicatively coupled with the MeNB and the SeNB.

10. The one or more non-transitory, computer-readable media of claim 6, wherein the instructions, when executed, further cause the MeNB to transmit a request for the status report to the SeNB.

* * * * *